United States Patent
Girt et al.

(10) Patent No.: US 6,964,819 B1
(45) Date of Patent: Nov. 15, 2005

(54) ANTI-FERROMAGNETICALLY COUPLED RECORDING MEDIA WITH ENHANCED RKKY COUPLING

(75) Inventors: Erol Girt, Berkeley, CA (US); Mariana Rodica Munteanu, Santa Clara, CA (US); Hans Jürgen Richter, Palo Alto, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/429,798

(22) Filed: May 6, 2003

(51) Int. Cl.$^7$ .............................................. G11B 5/66
(52) U.S. Cl. ........................ 428/694 TM; 428/694 TS
(58) Field of Search .......................... 428/692, 694 T, 428/694 TM, 694 MM, 694 TS

(56) References Cited

U.S. PATENT DOCUMENTS

| | | | |
|---|---|---|---|
| 6,383,668 B1 * | 5/2002 | Fullerton et al. | 428/694 TM |
| 6,567,236 B1 * | 5/2003 | Doerner et al. | 360/97.01 |
| 6,602,612 B2 * | 8/2003 | Abarra et al. | 428/611 |

OTHER PUBLICATIONS

E.N. Inomata et al., Improved thermal stability of synthetic ferrimagnetic media with enhanced exchange coupling strength, Applied Physics Letters, Apr. 15, 2002, pp. 2719-2721, vol. 80 No. 15.

H.J. Richter et al., Simplified analysis of two-layer antiferromagnetically coupled media, Applied Physics Letters, Apr. 8, 2002, pp. 2529-2531, vol. 80, No. 14.

Eric E. Fullerton, et al., Antiferromagnetically coupled magnetic media layers for thermally stable high-density recording, Applied Physics Letters, Dec. 4, 2000, pp. 3806-3808, vol. 77, No. 23.

H. Yamanaka, et al., Enhancement of exchange coupling for antiferromagnetically coupled media, Journal of Applied Physics, May 15, 2002, pp. 8614-8616, vol. 91, No. 10.

E.N. Abarra et al., Longitudinal magnetic recording media with thermal stablization layers, Applied Physics letters, Oct. 16, 2000, pp. 2581-2583, vol. 77, No. 16.

* cited by examiner

*Primary Examiner*—Kevin M. Bernatz
(74) *Attorney, Agent, or Firm*—McDermott Will & Emery LLP

(57) ABSTRACT

An anti-ferromagnetically coupled ("AFC") magnetic recording medium with RKKY coupling between spaced-apart magnetic layers comprising a non-magnetic substrate having a surface, and a layer stack atop the substrate surface. The layer stack comprises, in overlying sequence from the substrate surface: a magnetic stabilization layer, a non-magnetic spacer layer, and a main magnetic recording layer the main magnetic recording layer comprises, in overlying sequence from the non-magnetic spacer layer: (i) a top interface layer, (ii) a Cr alloy magnetic layer, and (iii) a top magnetic layer.

16 Claims, 4 Drawing Sheets

US 6,964,819 B1

ANTI-FERROMAGNETICALLY COUPLED RECORDING MEDIA WITH ENHANCED RKKY COUPLING

FIELD OF THE INVENTION

The present invention relates to very high areal recording density, anti-ferromagnetically coupled ("AFC") magnetic recording media, such as hard disks, with enhanced RKKY-type coupling providing improved performance. More particularly, the present invention relates to an improved AFC recording media including a main (upper) magnetic recording layer comprised of at least three distinct layers for providing enhanced RKKY-type coupling between the main (upper) magnetic recording layer and a spaced-apart magnetic stabilization layer.

BACKGROUND OF THE INVENTION

Magnetic recording ("MR") media and devices incorporating same are widely employed in various applications, particularly in the computer industry for data/information storage and retrieval applications, typically in disk form. Conventional magnetic thin-film media, wherein a fine-grained polycrystalline magnetic alloy layer serves as the active recording medium layer, are generally classified as "longitudinal" or "perpendicular", depending upon the orientation of the magnetic domains of the grains of magnetic material.

A portion of a conventional longitudinal recording, hard disk-type magnetic recording medium 1 commonly employed in computer-related applications is schematically illustrated in FIG. 1, and comprises a substantially rigid, non-magnetic metal, glass, ceramic, glass-ceramic, or polymeric substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) alloy, a chromium-titanium (Cr—Ti) alloy, a tantalum (Ta) layer, or a tantalum nitride (TaN) layer; a polycrystalline underlayer 12B, typically of Cr or a Cr-based alloy, a magnetic recording layer 13, e.g., of a cobalt (Co)-based alloy with one or more of platinum (Pt), Cr, boron (B), etc.; a protective overcoat layer 14, typically containing carbon (C), e.g., a diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. However, severe difficulties, such as thermal instability, are encountered when the bit density of longitudinal media is increased above about 20–50 Gb/in$^2$ in order to form ultra-high recording density media, because the necessary reduction in grain size reduces the magnetic energy, $E_m$, of the grains to near the superparamagnetic limit, whereby the grains become thermally unstable. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, is to increase the crystalline anisotropy and therefore increase the magnetic energy of the grains, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of spaced-apart ferromagnetic layers which are anti-ferromagnetically-coupled ("AFC") by means of an interposed thin, non-magnetic spacer layer. RKKY-type coupling between the spaced-apart magnetic layers is presumed to increase the effective volume of each of the magnetic grains, thereby increasing their stability; the coupling strength J between the ferromagnetic layer pairs being a key parameter in determining the increase in stability.

Notwithstanding the improvements in performance of ultra-high areal density magnetic recording media provided by the anti-ferromagnetically coupled main recording and stabilization layers as described supra, further improvement of AFC media performance, e.g., SMNR and bit error rate, is desired.

Accordingly, there exists a need for improved thermally stable, high areal density anti-ferromagnetically coupled (AFC) magnetic recording media and manufacturing methodology therefor, with enhanced RKKY-type coupling providing improved thermal stability and performance characteristics, such as signal-to-media noise ratio (SMNR) and bit error rate, which media can be fabricated at a cost competitive with that of conventional manufacturing technologies for forming high areal density AFC-type magnetic recording media. There also exists a need for improved, high areal density, AFC-type magnetic recording media, e.g., in disk form, which media include vertically spaced-apart, anti-ferromagnetically coupled ferromagnetic alloy layers separated by a non-magnetic spacer layer, wherein RKKY-type coupling between the spaced-apart magnetic layers is enhanced vis-a-vis conventionally structured AFC media and the media exhibit improved thermal stability and performance characteristics.

The present invention, therefore, facilitates cost-efficient manufacture of high areal recording density, thermally stable, high SMNR, low bit error rate AFC magnetic recording media, e.g., in the form of hard disks, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved anti-ferromagnetically coupled ("AFC") magnetic recording medium with enhanced RKKY-type coupling between spaced-apart magnetic layers.

Another advantage of the present invention is an improved method of manufacturing an anti-ferromagnetically coupled ("AFC") magnetic recording medium with enhanced anti-ferromagnetic exchange density, $J_{ex}$, and signal-to-media noise ratio (SMNR).

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by an anti-ferromagnetically coupled ("AFC") magnetic recording medium with enhanced RKKY-type coupling between spaced-apart magnetic layers, comprising:
 a non-magnetic substrate having a surface; and
 a layer stack atop the substrate surface, the layer stack comprising, in overlying sequence from the substrate surface:
  a magnetic stabilization layer;
  a non-magnetic spacer layer; and
  a main magnetic recording layer, the main magnetic recording layer comprising, in overlying sequence from said non-magnetic spacer layer:
   (i) a top interface layer;
   (ii) a Cr-rich magnetic layer; and
   (iii) a top magnetic layer.

According to embodiments of the present invention, the magnetic stabilization layer includes a bottom ferromagnetic layer comprised of Co or an alloy of Co with at least one element selected from the group consisting of: Cr, Pt, Ta, B, W, Mo, Ru, Si, Cu, Ag, Ge, Nb, Fe, and Ni; and the magnetic stabilization layer may further include an optional bottom interface ferromagnetic layer intermediate said the ferromagnetic layer and the non-magnetic spacer layer, the bottom interface ferromagnetic layer having a large magnetic moment $M_s>300$ emu/cc and comprised of Co or an alloy of Co with at least one element selected from the group consisting of Cr, Pt, Ta, B, Fe, Cu, Ag, W, Mo, Ru, Si, Ge, Nb, and Ni.

In accordance with further embodiments of the present invention, the non-magnetic spacer layer comprises a material selected from the group consisting of Ru, Rh, Ir, Cr, Cu, Re, V, and their alloys; the top interface layer is a ferromagnetic layer having a large magnetic moment $M_s>300$ emu/cc and is comprised of Co or an alloy of Co with at least one element selected from the group consisting of Cr, Pt, Ta, B, Fe, Cu, Ag, W, Mo, Ru, Si, Ge, Nb, and Ni; the Cr-rich magnetic layer is a ferromagnetic layer comprised of a CoCrX alloy, wherein X is at least one element selected from the group consisting of Pt, Ta, B, Mo, Ru, Si, Ge, Nb, Fe, and Ni, wherein, according to embodiments of the invention, the amount of Cr in the CoCrX alloy is $>\sim14$ at. %, and according to other embodiments of the invention, the amount of Cr in the CoCrX alloy varies continuously or discontinuously across the thickness of the Cr-rich magnetic layer from $>\sim8$ at. % adjacent the top magnetic layer to $>\sim14$ at. % adjacent the top interface layer.

According to still further embodiments of the present invention, the top magnetic layer is comprised of a ferromagnetic material having a magnetic moment Ms greater than that of the Cr-rich magnetic layer and a lower Cr concentration than that of the Cr-rich magnetic layer, and the top magnetic layer comprises CoCr or an CoCr alloy with at least one element selected from the group consisting of Pt, Ta, B, Mo, Ru, Si, Cu, Ag, Ge, Nb, Fe, and Ni.

Preferred embodiments of the present invention include those wherein the top magnetic layer comprises CoCr alloyed with at least B, the amount of B in the alloy being greater than the amount of B in the Cr-rich magnetic layer, i.e., the amount of B in the Cr-rich magnetic layer does not exceed ~16 at. %.

Still further embodiments of the present invention include those wherein the medium further comprises a non-magnetic seed layer/underlayer pair intermediate the substrate surface and the layer stack for controlling the crystallographic texture of Co-based alloys; the seed layer is comprised of an amorphous or fine-grained non-magnetic material selected from the group consisting of Ni—Al, Fe—Al, Cr—Ti, Cr—Ta, Ta, Ta—W, Ru—Al, and Ta—N, the underlayer is comprised of Cr or a non-magnetic Cr-based alloy; and the medium further comprises a non-magnetic interlayer intermediate the seed layer/underlayer pair and the layer stack, the non-magnetic interlayer comprising a CoCrX alloy, where X is at least one element selected from the group consisting of Pt, Ta, B, Mo, and Ru.

Another aspect of the present invention is a method of manufacturing an anti-ferromagnetically coupled ("AFC") magnetic recording medium with enhanced anti-ferromagnetic exchange density, $J_{ex}$, and signal-to-media noise ratio (SMNR), comprising steps of:
 (a) providing a non-magnetic substrate having a surface; and
 (b) forming, by sputtering, a layer stack atop the substrate surface, the layer stack comprising, in overlying sequence from the substrate surface:
  (i) a non-magnetic seed/underlayer pair;
  (ii) a bottom magnetic layer;
  (iii) a bottom interface layer;
  (iv) a non-magnetic spacer layer;
  (v) a top interface layer;
  (vi) a Cr-rich magnetic layer; and
  (vii) a top magnetic layer, wherein:
 layers (iii)–(v) are sputter deposited either with zero bias voltage or with application of a relatively lower bias voltage and layers (i)–(ii) and (vi)–(vii) are sputter deposited with application of a relatively higher bias voltage, or layers (i)–(v) are sputter deposited with zero bias voltage or with application of a relatively lower bias voltage and layers (vi)–(vii) are sputter deposited with application of a relatively higher bias voltage.

In accordance with embodiments of the present invention, step (b) comprises forming an about 0.5 nm thick Co layer as the bottom interface layer (iii), an about 0.6 nm thick Ru layer as the non-magnetic spacer layer (iv), and an about 0.3 nm thick Co layer as the top interface layer (v).

According to preferred embodiments of the present invention, step (b) comprises maintaining the substrate at a temperature above about 500 K during the sputtering and applying an about 0 to about 100 V bias voltage as the zero or relatively lower bias voltage and up to about 400 V bias voltage as the relatively higher bias voltage.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon the discovery that improved high areal recording density, thin-film, anti-ferromagnetically coupled (AFC) magnetic media, e.g., longitudinal recording media, having improved performance, e.g., enhanced signal-to-media noise ratio (SMNR), bit error rate, and anti-ferromagnetic exchange density $J_{ex}$, can be reliably and controllably manufactured by providing a stacked multilayer, anti-ferromagnetically coupled (AFC) structure wherein the main, or upper, magnetic recording layer which is anti-ferromagnetically coupled to a lower, magnetic stabilization layer via an intervening non-magnetic spacer layer, is formed as a three-layer structure, comprising, in overlying sequence from the non-magnetic spacer layer, a top interface layer, a Cr-rich magnetic layer, and a top magnetic layer. According to a key feature of the invention, enhanced RKKY-coupling is advantageously provided by fabricating the upper, magnetic recording layer as the aforementioned three-layer structure. Another key feature of the present invention for providing AFC media with enhanced SMNR and $J_{ex}$ is sputter deposition of each of the constituent layers, wherein certain layers are sputter deposited with application of a bia voltage, and certain other layers, particularly the Cr-rich magnetic layer and the top magnetic layer, are sputter deposited without application of a bias voltage.

The inventive methodology and three-layer structure of the upper, magnetic recording layer thus provide several advantages not obtainable according to the conventional art for AFC recording media, e.g., enhanced SMNR, $J_{ex}$, and reduced bit error rate, while affording ease and simplicity of manufacture at costs competitive with those of conventional AFC media.

Figure 1:
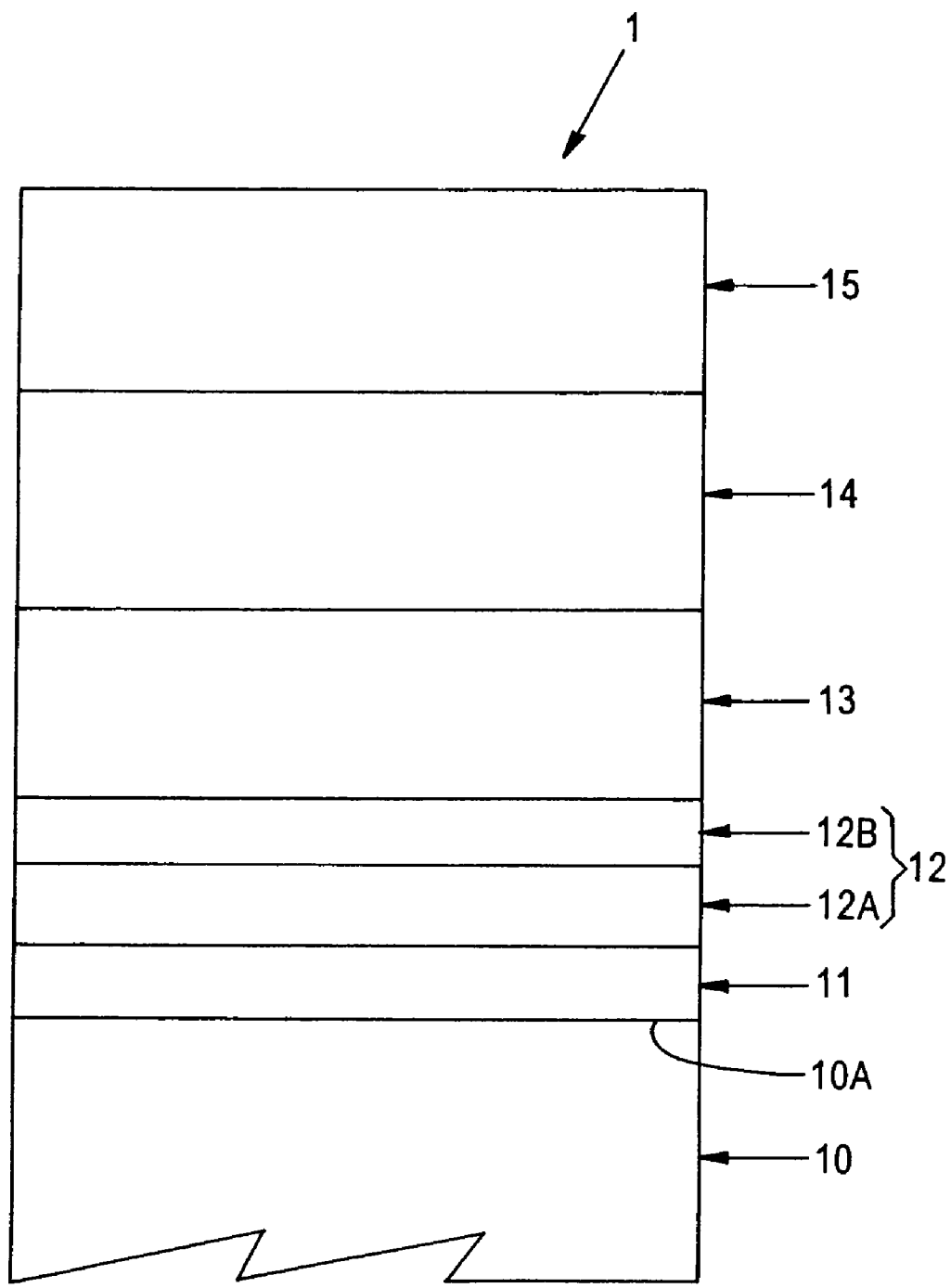
FIG. 1 schematically illustrates, in simplified, cross-sectional-view, a portion of a conventional longitudinal magnetic recording medium.
Figure 2:
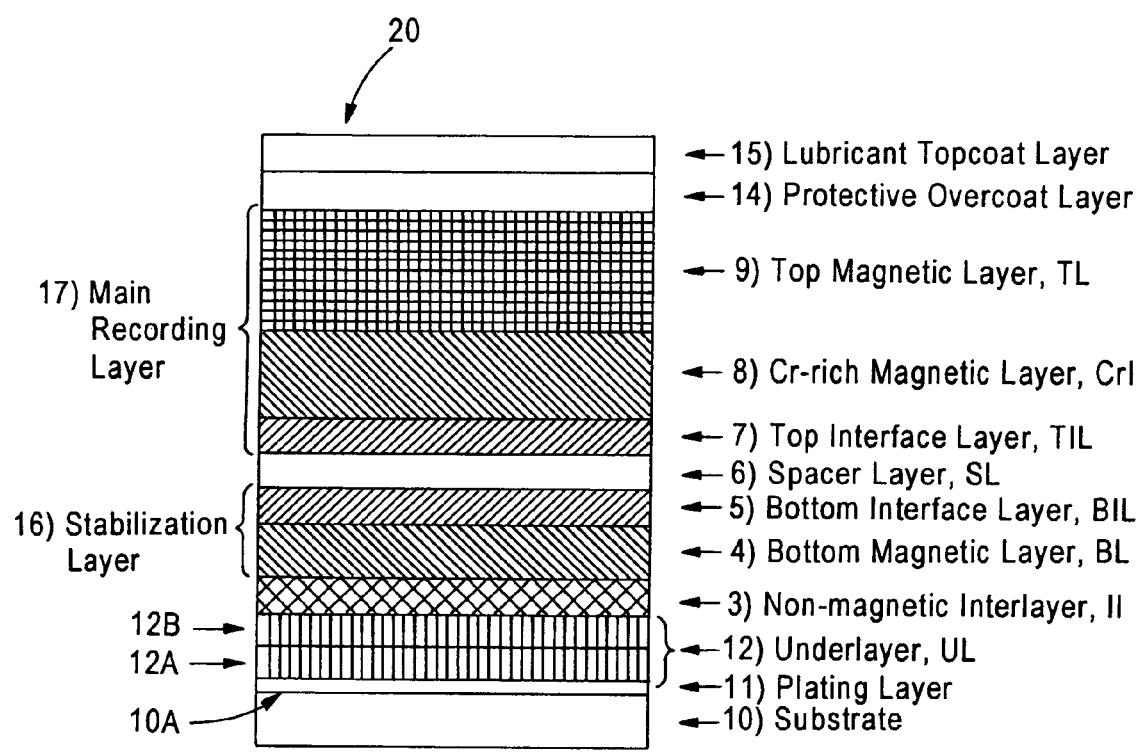
FIG. 2 schematically illustrates, in simplified, cross-sectional-view, a portion of an embodiment of an anti-ferromagnetically (AFC) coupled magnetic recording medium according to the present invention.
Figure 3:
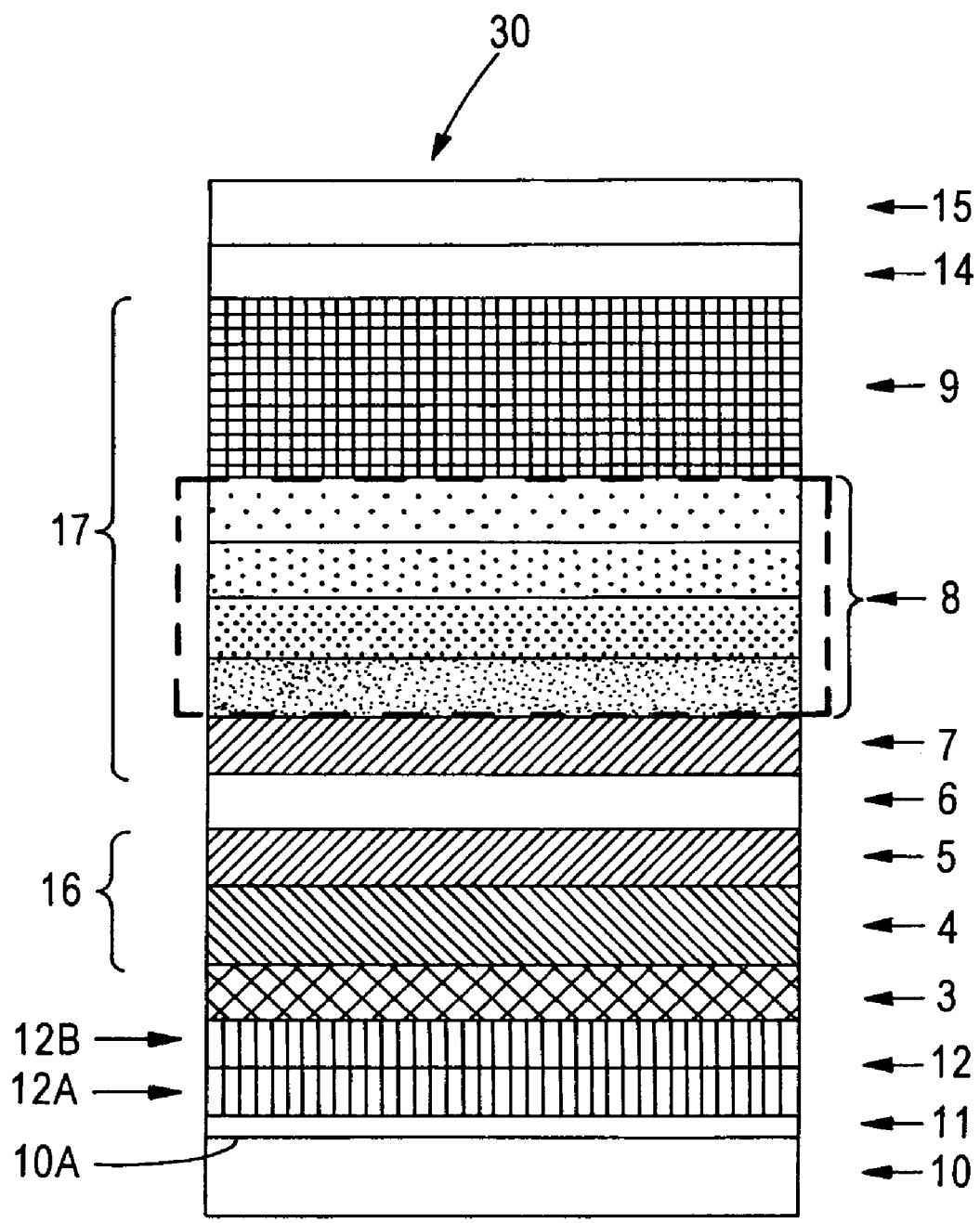
FIG. 3 schematically illustrates, in simplified, cross-sectional-view, a portion of another embodiment of an anti-ferromagnetically (AFC) coupled magnetic recording medium according to the present invention.

FIGS. 2–3 schematically illustrate, in simplified cross-sectional view, embodiments of magnetic recording media embodying the three-layer upper magnetic recording layer concept according to the present invention. An embodiment of a magnetic recording medium 20 according to the invention is shown in FIG. 2 and includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. When medium 20 takes the form of a hard disk, substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer ("UL") 12, including a seed layer 12A and a polycrystalline underlayer 12B, for controlling the crystallographic texture and properties of ferromagnetic Co-based alloy layers deposited thereover. Seed layer 12A is comprised of an amorphous or fine-grained material, e.g., a Ni—Al, Fe—Al, Cr—Ti, Cr—Ta, Ta, Ta—W, Ru—Al, or TaN layer from about 10 to about 500 Å thick, preferably about 10 to about 25 nm thick. The overlying non-magnetic, polycrystalline underlayer 12B is typically a Cr or Cr-based alloy layer (e.g., of Cr—W, Cr—Mo, CoCr, etc.), or a $Cr/Cr_{100-x}M_x$, bi-layer structure, where M is a metal selected from among W, Mo, Ta, Ti, and V and wherein x varies from 0 to about 30, depending upon M (e.g., $Cr/Cr_{90}W_{10}$), which underlayer 12B generally is from about 30 to about 150 Å thick, preferably from about 6 to about 10 nm thick.

Overlying and in contact with underlayer 12B is an optional non-magnetic interlayer ("IL") 3, comprising an up to about 8 nm thick, preferably from about 2 to about 5 nm thick, layer of a CoCrX alloy, where X is at least one element selected from the group consisting of Pt, Ta, B, Mo, and Ru.

Medium 20 further includes, as part of its layer stack, a lower ferromagnetic, or stabilization layer 16, comprised of a bottom magnetic layer ("BL") 4 in contact with optional non-magnetic interlayer 3 (or underlayer 12B), and an overlying, optional bottom interface layer ("BIL") 5, wherein the bottom magnetic layer 4 comprises an about 0.5 to about 7 nm thick layer of a ferromagnetic material selected from Co and alloys of Co with at least one element selected from the group consisting of: Cr, Pt, Ta, B, W, Mo, Ru, Si, Cu, Ag, Ge, Nb, Fe, and Ni, and the optional bottom interface layer 5 comprises an up to about 1 nm thick, preferably about 0.5 nm thick, layer of a ferromagnetic material having a large saturation magnetization $M_s$>300 emu/cc, selected from Co and alloys of Co with at least one element selected from the group consisting of Cr, Pt, Ta, B, Fe, Cu, Ag, W, Mo, Ru, Si, Ge, Nb, and Ni.

Overlying and in contact with optional bottom interface layer 5 (or bottom magnetic layer 4) of lower ferromagnetic, or stabilization layer 16 is non-magnetic spacer layer ("SL") 6 for providing anti-ferromagnetic RKKY-type coupling between the lower, ferromagnetic stabilization layer 16 and upper ferromagnetic, or main recording layer 17, non-magnetic spacer layer 6 being from about 0.4 to about 1.2 nm thick, preferably from about 0.2 to about 0.5 nm thick, and comprised of a non-magnetic material selected from the group consisting of Ru, Rh, Ir, Cr, Cu, Re, V, and their alloys.

According to the embodiment of the invention illustrated in FIG. 2, upper ferromagnetic, or main recording layer 17, is comprised, in sequence, of three (3) distinct, overlying layers, i.e., (1) a top interface layer ("TIL") 7 in overlying contact with the non-magnetic spacer layer 6, (2) a Cr-rich magnetic layer ("CrL") 8, and (3) a top magnetic layer ("TL"), wherein:

(1) top interface layer 7 is up to about 2 nm thick, preferably from about 0.2 to about 0.5 nm thick, and comprised of a ferromagnetic layer having a large saturation magnetization $M_s>300$ emu/cc, selected from Co and alloys of Co with at least one element selected from the group consisting of Cr, Pt, Ta, B, Fe, Cu, Ag, W, Mo, Ru, Si, Ge, Nb, and Ni;

(2) Cr-rich magnetic layer 8 is up to about 20 nm thick, and comprised of a CoCrX alloy, where X is at least one element selected from the group consisting of Pt, Ta, B, Mo, Ru, Si, Ge, Nb, Fe, and Ni, and the amount of Cr in the CoCrX alloy is >~14 at. %; and (3) top magnetic layer 9 is up to about 20 nm thick, and comprised of a ferromagnetic material having a saturation magnetization $M_s$ greater than that of the Cr-rich magnetic layer 8 and a lower Cr concentration than that of the Cr-rich magnetic layer 8, selected from CoCr and CoCr alloys with at least one element selected from the group consisting of Pt, Ta, B, Mo, Ru, Si, Cu, Ag, Ge, Nb, Fe, and Ni. Illustratively, top magnetic layer 9 may comprise CoCr alloyed with at least B, the amount of B in the alloy being greater than the amount of B in the Cr-rich magnetic layer 8, wherein the amount of B in said Cr-rich magnetic layer does not exceed ~16 at. %.

According to the embodiment of the invention illustrated in FIG. 3, medium 30 comprises a Cr-rich magnetic layer 8' up to about 20 nm thick, and comprised of a CoCrX alloy, where X is at least one element selected from the group consisting of Pt, Ta, B, Mo. Ru, Si, Ge, Nb, Fe, and Ni, and the amount of Cr in the CoCrX alloy varies continuously or discontinuously across the thickness of the Cr-rich magnetic layer 8 from >~8 at. % adjacent the top magnetic layer 9 to >~14 at. % adjacent the top interface layer 7.

Completing the layer stack constituting medium 20 or medium 30 is a protective overcoat layer 14 in overlying contact with the top magnetic layer 9, which protective overcoat layer typically comprises carbon (C), e.g., in the form of a diamond-like carbon ("DLC"), and a lubricant topcoat layer 15 in overlying contact with the protective overcoat layer, e.g., a thin layer of a perfluoropolyether compound.

Each of the layers constituting magnetic recording media 20 and 20' of the present invention, except for the lubricant topcoat layer 15, may be deposited or otherwise formed by any suitable physical vapor deposition technique (PVD), e.g., sputtering, or by a combination of PVD techniques, i.e., sputtering, vacuum evaporation, etc., with sputtering being preferred. Lubricant topcoat layer 15 is typically provided over the upper surface of the protective overcoat layer 14 in conventional fashion, e.g., as by dipping of the medium into a bath containing a solution of the lubricant compound, followed by removal of excess liquid, as by wiping.

As indicated supra, in AFC media the top (or main) magnetic recording layer (i.e., closer to the read/write head) is AFC coupled with a thin magnetic stabilization layer across a non-magnetic spacer layer (e.g., Ru). Due to the coupling, the stability of the main recording layer increases and can be balanced against the decreased average grain volume or anisotropy of the main recording layer. The increase in stability of the main recording layer depends upon the strength of the coupling between the main recording and stabilization layers. According to embodiments of the invention, bottom and top interface layers (BIL and TIL, respectively) are introduced on both sides of the non-magnetic spacer layer (SL) to increase the coupling between the top (or main) recording layer and the lower stabilization layer.

Figure 4:
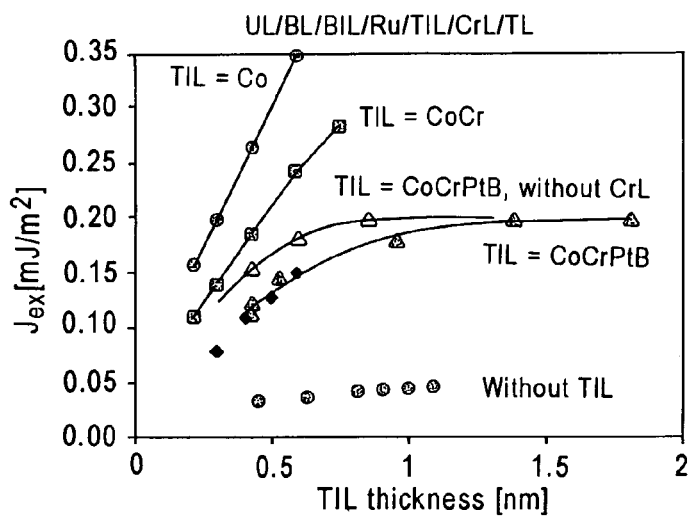
FIG. 4 is a graph for illustrating the variation of anti-ferromagnetic coupling (AFC) between the upper, main recording and lower, stabilization layer as a function of the thickness of the top interface layer component of the upper, main recording layer.

Referring now to FIG. 4, shown therein is a graph for illustrating the variation of the strength of anti-ferromagnetic coupling (AFC) between the upper, main recording and lower, stabilization layer as a function of the thickness of the top interface layer component (TIL) of the upper, main recording layer, for an AFC structure of UL/BL/BIL/SL/TIL/CrL/TL, where BIL=0.4 nm Co and SL= Ru.

FIG. 4 shows that without the TIL component of the upper, main recording layer, the strength of the AFC ranges from about 0.03 to about 0.05 $mJ/m^2$, depending upon the thickness of the bottom magnetic layer (BL) of the stabilization layer. This increase in AFC is mainly due to dipole-dipole interaction between magnetic grains of the main recording and stabilization layers. Thus, the strength of RKKY and dipole-dipole interactions are comparable in media structures without a top interface layer (TIL). On the other hand, in media structures with a top interface layer (TIL), the AFC increases several times due to the increase in RKKY-type interaction.

The increase in RKKY-type interaction is related to the choice of the material of the TIL. For example, for TIL's comprising CoCrPtB alloys with about 70–72 at. % Co, e.g., 14-8-8, the strength of the AFC increases to about 0.2 $mJ/m^2$ for TIL thickness >~1.5 nm. In this regard, it is notable that for the same TIL compositions and without the Cr-rich layer (CrL), i.e., with only a top magnetic layer (TL), the strength of the AFC reaches ~0.2 $mJ/m^2$ for thinner TIL's, i.e., ~0.9 nm thick.

The composition of an about 1 nm thick layer depends upon the composition of the adjacent layers due to interface roughness and inter-diffusion between the adjacent layers. Thus, if the layer above the TIL has a higher Cr concentration, it is expected that a thin TIL (below ~1.5 nm) would also have a higher Cr concentration leading to reduction in the strength of the AFC.

As is also evident from FIG. 4, for TIL's comprised of CoCr or Co, the increase in strength of AFC is quite significant.

Figure 5:
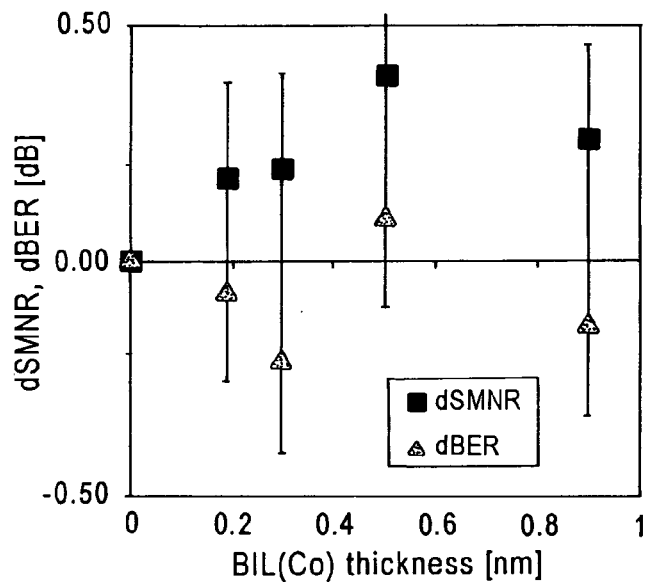
FIG. 5 is a graph for illustrating the variation of signal-to-media noise ratio (SMNR) and bit error rate of AFC media according to the invention as a function of the bottom interface layer thickness.
Figure 6:
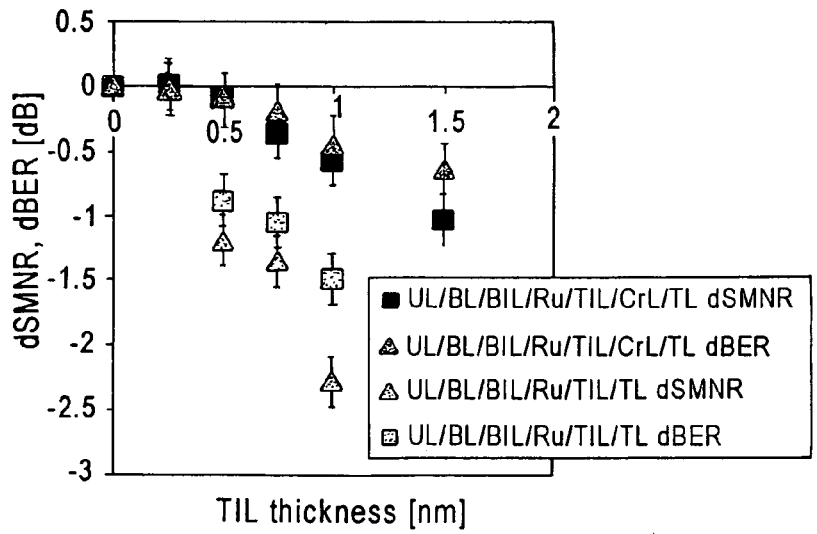
FIG. 6 is a graph for illustrating the variation of SMNR and bit error rate of AFC media according to the invention as a function of the top interface layer thickness.

FIGS. 5 and 6 illustrate the effect of BIL and TIL on the recording properties of AFC media according to the invention. Specifically, FIG. 5 is a graph for illustrating the variation of signal-to-media noise ratio (SMNR) and bit error rate of AFC media of UL/BL/BIL/SL/TIL/CrL/TL structure according to the invention (where BIL=0.4 nm Co and SL=Ru) as a function of the bottom interface layer (BIL) thickness; and FIG. 6 is a graph for illustrating the variation of SMNR and bit error rate of AFC media of UL/BL/BIL/SL/TIL/CrL/TL structure according to the invention (where BIL=0.4 nm Co and SL=Ru) or of UL/BL/BIL/SL/TIL/TL structure according to the invention (where BIL=0.4 nm Co and SL=Ru), as a function of the top interface layer (TIL) thickness.

While different material compositions such as Co, CoCr, CoCrTa, and CoCrPtB have been utilized for the BIL, the following discussion relates particularly to Co. The recording properties of magnetic media are particularly sensitive to the presence of the Co layer because it introduces strong coupling between the magnetic grains of the media. FIG. 4 shows that the recording properties, e.g., signal-to-media noise ratio (SMNR) and bit error rate (BER), of AFC media are unaffected if the Co BIL is thinner than ~1 nm; whereas, for a very thin TIL, i.e., <~0.5 nm (<~0.3 nm for Co TIL), the recording properties of AFC media do not deteriorate. FIG. 5 shows thar the recording properties of AFC media deteriorate significantly (i.e., >~1 dB in SMNR for BIL >~0.5 nm) if the Cr-rich layer (CrL) is removed from the media structure. On the other hand, stability of AFC media with enhanced coupling provided by the present invention is significantly improved. The increase in the magnetic energy of the grains in the top magnetic layer as a function of the coupling strength between the top and bottom magnetic layers can be calculated, for example, by means of equation 5 described in H. J. Richter, et al., *Appl. Phys. Lett.*, 80, 2529 (2002).

In addition to the above-described improvements provided by the inventive structure, it is observed that the overwrite capabilities/characteristics of AFC media improve with increase in the coupling between the top and bottom magnetic layers. The improved stability and overwrite capability of the AFC media with enhanced coupling can be utilized for improving the SMNR of the media by decreasing the grain size and increasing the anisotropy of the magnetic grains of the top magnetic layer of the media.

It therefore follows that, in order to preserve/maintain good recording properties of AFC media, the upper, or main recording layer should comprise at least three (3) layers, as follows:

(1) a top magnetic layer (TL);
(2) a Cr-rich magnetic layer (CrL); and
(3) a top interface layer (TIL), wherein the thickness of the TIL is critical for achieving optimum recording properties, e.g., <~0.5 nm for the investigated TIL materials.

As has been demonstrated above, the bottom and top interface layers, particularly the top interface layer (TIL) must be thin in order to preserve/maintain good recording properties of AFC media. However, thin layers are very sensitive to the sputtering conditions utilized in their formation, and therefore, the sputtering conditions must be optimized for obtaining AFC media with best recording performance. It has been determined that for AFC media wherein the various constituent layers are sputter-deposited at substrate temperatures >~500 K, the applied bias voltage is critical for obtaining optimum coupling strength $J_{ex}$ and recording properties, e.g., SMNR.

For example, for the inventive AFC media of structure: substrate/UL/IL/BL/BIL/SL/TiL/CrL/TL, where BIL and TIL are Co layers 0.4 nm and 0.25 nm thick, respectively, and SL is Ru, the various constituent layers must be sputter-deposited at different applied bias voltages. In particular, the results given in Table I demonstrate that a significant improvement in $J_{ex}$ and dSMNR is obtained for the inventive AFC media when at least the BIL and TIL are sputtered at 0 V applied bias.

TABLE I

| UL/BL/BIL (0.4 nm Co)/SL (Ru)/TIL (0.25 nm Co)/CrL/TL | $J_{ex}$ [mJ/m$^2$] | dSMNR [dB] |
|---|---|---|
| SL sputtered at 0 V bias; all other layers sputtered at 400 V bias | 0.07 | −0.7 |
| BIL, SL, and TIL sputtered at 0 V bias; other layers at 400 V bias | 0.13 | −0.2 |
| UL, BL, BIL, SL, and TIL sputtered at 0 V bias, others 400 V bias | 0.15 | 0 |

Thus, it has been demonstrated that enhanced RKKY-type coupling and superior recording properties in AFC media can be obtained with an upper, or main recording layer having a 3-layer configuration comprised, in sequence, of a top interface layer in contact with a non-magnetic spacer layer, a Cr-rich magnetic layer, and a top magnetic layer. In addition, optimal coupling and recording properties of the inventive AFC media are provided by appropriate selection of the bias voltage applied during sputter deposition of each constituent layer.

The present invention thus advantageously provides high quality, thermally stable, high areal recording density magnetic recording media, which media achieve enhanced RKKY-type coupling and recording performance characteristics such as higher SMNR and lower bit error rate via formation of the inventive 3-layer configuration of the upper, or main recording layer. Moreover, the inventive methodology can be practiced in a cost-effective manner, utilizing conventional manufacturing technology and equipment (e.g., sputtering technology and equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled ("AFC") magnetic recording medium RKKY coupling between spaced apart magnetic layers, comprising:
   a non-magnetic substrate having a surface; and
   a main magnetic recording layer, said main magnetic recording layer comprising, in overlying sequence from said substrate surface:
   (i) a top interface layer;
   (ii) a Cr alloy magnetic layer; and (iii) a top magnetic layer, wherein the amount of Cr in said Cr alloy varies across the thickness of said Cr alloy magnetic layer from >~8 at. % adjacent said top magnetic layer to >~14 at. % adjacent said top interface layer.

2. The medium as in claim 1, further comprising a magnetic stabilization layer and a non-magnetic spacer layer in overlying sequence from said substrate surface intermediate said substrate surface and said main magnetic recording layer.

3. The medium as in claim 1, wherein:
said top interface layer is a ferromagnetic layer having a large saturation magnetization $M_s$>300 emu/cc and is comprised of Co or an alloy of Co with at least one element selected from the group consisting of Cr, Pt, Ta, B, Fe, Cu, Ag, W, Mo, Ru, Si, Ge, Nb, and Ni.

4. The medium as in claim 1, wherein:
said Cr alloy magnetic layer is a ferromagnetic layer comprised of a CoCrX alloy, where X is at least one element selected from the group consisting of Pt, Ta, B, Mo, Ru, Si, Ge, Nb, Fe, and Ni.

5. The medium as in claim 1, wherein:
said top magnetic layer is comprised of a ferromagnetic material having a saturation magnetization $M_s$ greater than that of said Cr alloy magnetic layer and a lower Cr concentration than that of said Cr alloy magnetic layer.

6. The medium as in claim 5, wherein:
said top magnetic layer comprises CoCr or an CoCr alloy with at least one element selected from the group consisting of Pt, Ta, B, Mo, Ru, Si, Cu, Ag, Ge, Nb, Fe, and Ni.

7. The medium as in claim 6, wherein:
said top magnetic layer comprises CoCr alloyed with at least B, the amount of B in said alloy being greater than the amount of B in said Cr alloy magnetic layer.

8. The medium as in claim 7, wherein:
said amount of B in said Cr alloy magnetic layer does not exceed ~16 at. %.

9. The medium as in claim 2, wherein:
said magnetic stabilization layer includes a bottom ferromagnetic layer comprised of Co or an alloy of Co with at least one element selected from the group consisting of: Cr, Pt, Ta, B, W, Mo, Ru, Si, Cu, Ag, Ge, Nb, Fe, and Ni.

10. The medium as in claim 9, wherein:
said magnetic stabilization layer further includes a bottom interface ferromagnetic layer intermediate said bottom ferromagnetic layer and said non-magnetic spacer layer.

11. The medium as in claim 10, wherein:
said bottom interface ferromagnetic layer has a large saturation magnetization $M_s$>300 emu/cc and is comprised of Co or an alloy of Co with at least one element selected from the group consisting of Cr, Pt, Ta, B, Fe, Cu, Ag, W, Mo, Ru, Si, Ge, Nb, and Ni.

12. The medium as in claim 2, wherein:
said non-magnetic spacer layer comprises a material selected from the group consisting of Ru, Rh, Ir, Cr, Cu, Re, V, and their alloys.

13. The medium as in claim 2, wherein:
said medium further comprises a non-magnetic seed layer/underlayer pair intermediate said substrate surface and said magnetic stabilization layer for controlling the crystallographic texture of Co-based alloys.

14. The medium as in claim 13, wherein:
said seed layer is comprised of an amorphous or fine-grained non-magnetic material selected from the group consisting of Ni—Al, Fe—Al, Cr—Ti, Cr—Ta, Ta, Ta—W, Ru—Al, and Ta—N and said underlayer is comprised of Cr or a non-magnetic Cr-based alloy.

15. The medium as in claim 13, wherein:
said medium further comprises a non-magnetic interlayer intermediate said seed layer/underlayer pair and said magnetic stabilization layer.

16. The medium as in claim 15, wherein:
said non-magnetic interlayer comprises a CoCrX alloy, where X is at least one element selected from the group consisting of Pt, Ta, B, Mo, and Ru.

* * * * *